3,000,758
PROCESS FOR CONFERRING ANTISTATIC PROPERTIES AND THE RESULTING PRODUCTS
Georg Hennemann, Velp, and Albertus Gerardus Lutgerhorst, Arnhem, Netherlands, assignors to American Enka Corporation, Enka, N.C., a corporation of Delaware
No Drawing. Filed July 23, 1956, Ser. No. 599,307
Claims priority, application Netherlands Aug. 3, 1955
6 Claims. (Cl. 117—72)

This invention relates to a process for rendering antistatic products not conducting electricity, i.e., having dielectric properties, and to products treated according to said process.

One of the principal objects of the present invention is to provide a new and improved method for treating non-electrically-conductive products, whether in the form of threads, fibers, foils, yarns, knitted and woven textile articles, etc., in such manner as to render them substantially completely antistatic.

A further object of the invention is to provide a method for treating such products for the purpose indicated in order to confer upon them antistatic properties that will persist despite subsequent treating operations to which the products may be subjected, such as washing, dyeing, etc.

A still further object of the invention is to provide improved dielectric products of the kind indicated that have been rendered substantially antistatic in accordance with the methods described herein, whereby their antistatic properties will remain after subsequent treating operations to which they may be subjected.

The manner in which these and other objects and features of the invention are attained will appear more fully from the following description and a simplified flow diagram wherein the blocks connected by solid lines show the several steps of the process, and the dotted lines show a modified process in which the first and second liquid treating steps are combined, whereafter the drying at a temperature above 100° C. is sequentially followed by a rinse and the final drying.

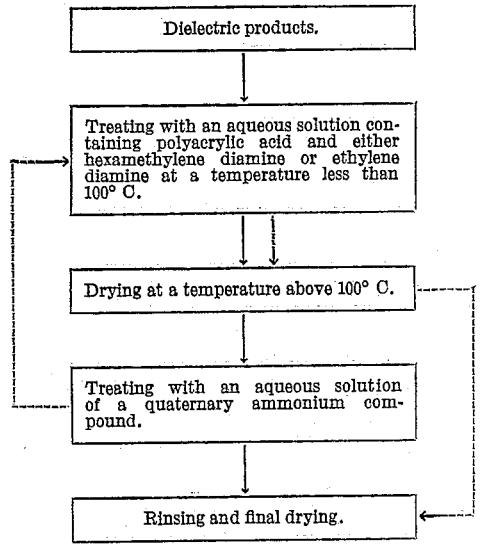

Products not conducting electricity have the property that they become electrostatically charged during further processing and during use. These electrostatic charges, which may occur by rubbing the products against each other or by rubbing the products with other bodies, give rise to various disadvantages which may show themselves in different ways dependent upon the nature of the treatment or the use.

The electrostatically charged products may e.g. repel each other but they may also attract and hold dirt, dust, etc.

As examples of products not conducting electricity and which may be treated according to the process of the invention may be mentioned threads, fibers, cables, yarns, knitted and woven textile articles, as well as bristles, films, foils and products obtained by injection molding or by any other manner from synthetic hydrophobic polymers and copolymers, such as polyamides, polyesters and polyacrylonitrile derivatives. Furthermore, dielectric products manufactured from glass and porcelain may also be mentioned.

When an artificial thread or the like made from synthetic, hydrophobic polymers such as mentioned above is guided over guide means, such as guiding eyelets, guiding bars, thread brakes, etc. the friction that is unavoidably encountered creates charges upon the filaments and threads so that they repel each other thus giving rise to processing difficulties and sometimes even failures.

Staple fibers which must be spun to yarns can only with difficulty be carded due to the occurrence of electrostatic charges.

Even in ordinary use, hose or garments made from said threads or fibers attract dust and are very persistent in retaining said dust. Frequently runners and rugs retain dust and dirt so strongly that they cannot be cleaned by brushing, heating or vacuum cleaning.

To prevent the occurrence of static charges it has already been proposed to treat synthetic, hydrophobic threads, etc. with various preparations. However, since said preparations are more or less readily washed away the products treated therewith quite rapidly lose their antistatic property on dyeing or washing; and furthermore even without washing the antistatic effect diminishes substantially after a relatively short time.

In our prior copending U.S. application Serial No. 512,566, filed June 1, 1955, now Patent No. 2,936,249 there is described and claimed a process for rendering antistatic products not conducting electricity, the products being of the kind indicated above, in which process the products are treated with an aqueous solution of a polymeric, polyanion-active substance which, on being heated above 100° C., loses its solubility in water, whereupon the thus pretreated products are dried and subsequently heated above 100° C., the products being then treated with an aqueous solution of a cation-active soap and finally dried.

In order to apply on those products a stable antistatic layer, polymeric polyanion-active substances are used which, on being heated above 100° C., lose their solubility in water, and (as described in our aforesaid copending application) it is preferred to employ such substances as have carboxylic acid groups. Polyacrylic acid has proved to be very suitable.

Many variations are possible. For example, the first treating bath may be sprayed in warm condition, preferably at temperatures between 70 and 90° C., on the product to be treated or it may be applied to the product by means of suitable wetting rollers. Also an immersion process may be used. The products treated in this manner are subsequently dried at relatively low temperatures and thereupon baked at a temperature exceeding 100° C. This baking process is continued until the polyanion-active compound has become insoluble in water, but naturally not longer than is necessary to achieve that result in view of the possibility of discoloration and decomposition of the material if the heating is continued longer than necessary.

After baking, the products are then treated with an aqueous solution of a cation-active soap. It has been found that amongst others quaternary compounds such as alkyl trimethyl ammonium compounds and alkyl pyridinium compounds, are suitable as cation-active soaps. Also quaternary compounds of sulphur, phosphorous, arsenic, antimony and, under special conditions, also of oxygen may be employed. Experiments have shown that the quaternary ammonium compound, stearyl trimethyl ammonium chloride, is particularly suitable.

The treatment with the second bath is carried out in the same manner as the treatment with the first bath. Preferably the treatment is carried out at low temperatures but, if desired, for example to avoid a clouding of the cation-active soap solution, the treatment is effected at 50° C. or higher.

Since the pre-heated and baked product has an acid reaction, it is preferred to bring the treating bath to the correct pH so as to obtain a final product of neutral reaction.

It was found that the reaction of the cation-active soap with the anion-groups on the baked product proceeds very rapidly.

In many cases it is preferred to remove the excess cation-active substance which has not reacted with the anion-active groups. It was found that this may be done satisfactorily by rinsing immediately after the treatment with the cation-active soap. Particularly in the case of textile materials, a rinsing after the treatment is very desirable.

The drying after the treatment thus described is done in a normal manner.

By means of this process it is possible to apply a stable anti-static layer on products not conducting electricity. A disadvantage of this process, however, is the fact that the resistance to mechanical rubbing or abrasion of the anti-static layer thus formed is not very high, and particularly not if this rubbing or abrasion takes place in an alkaline medium.

An explanation of this phenomenon may be that the anhydride groups formed from the carboxylic groups by the baking step are converted under the influence of the alkaline medium into corresponding alkali metal salts. These alkali metal salts may bring about a binding of water molecules thus causing the layer to swell. Consequently the adhesion of the still insoluble anti-static layer to the treated material may become smaller so that this layer has less resistance to mechanical treatment, such as rubbing, wringing and the like. However, it is to be understood that we do not wish to be bound by any particular theory or reaction mechanism. On the contrary, it is a still further and specific object of the present invention to contribute to the art a highly desirable and important refinement and improvement over the process described in our prior copending application above refered to, and the disclosure of which, for convenience and brevity, is to be regarded as incorporated herein by reference.

According to the present invention, it has been discovered that the durability of the antistatic layer with respect to mechanical treatment, such as rubbing, abrasion, etc. in wet condition is much increased if such an amount of a bifunctional reagent of which the reaction product with the polyanion-active substance is soluble in water but becomes insoluble when heated above 100° C., is added to the aqueous solution of the polyanion-active substance that the reaction product still has an acid reaction.

The optimum amount of the bifunctional reagent which is to be added to the treating bath containing the polymeric polyanion-active substance is relatively small and may be conveniently and readily determined by simple orientation tests which are easy to carry out. It has been discovered that different bifunctional reagents are preferably used in different concentrations relative to the concentration of the polymeric polyanion-active substance.

Generally, about 1.5% by weight, calculated on the polymeric polyanion-active substance, is sufficient, although larger or smaller ratios, e.g. from about 1% to 3% or even somewhat more of the bifunctional reagent, may be employed with good results.

The bifunctional reagent renders the polymeric polyanion-active substance less hydrophobic so that only a very slight swelling occurs in water and lye. Consequently an antistatic layer is formed which has a very high resistance to mechanical treatment in aqueous alkaline medium, such as wringing, rubbing and bending.

Examples of suitable bifunctional reagents are, amongst others, hexamethylene diamine and ethylene diamine.

In order to indicate still more fully the nature of the present invention, the following examples of typical procedures are set forth, it being understood that this description is presented by way of illustration only, and not as limiting the scope of the invention.

*Example I*

A washed fabric of synthetic linear polyamide was soaked on a triple roller device in an aqueous solution containing 5.4% by weight of polyacrylic acid and 0.175% by weight of hexamethylene diamine. The temperature of the solution was 80° C. The pressing-out effect was about 45%.

After drying at room temperature, the fabric was stabilized and baked at 190° C. for a period of 20 seconds.

Subsequently the fabric was impregnated in a triple roller device at a temperature of 60° C. with a weakly alkaline aqueous solution of 0.2% of stearyl dimethyl benzyl ammonium chloride.

The pressing-out effect here was about 45%. Thereafter the fabric was rinsed and finally dried at room temperature. The fabric retained its antistatic character even after being treated with a boiling solution of 4% by weight of sodium hydroxide.

*Example II*

A fabric consisting of polycaprolactam was soaked on a triple roller device in an aqueous solution containing 5.0% by weight of polyacrylic acid, 0.15% by weight of hexamethylene diamine, and 0.0025% by weight of stearyl dimethyl benzyl ammonium chloride, and having a temperature of 80° C.

The pressing-out effect was about 45%.

After drying, the fabric was heated under tension at 190° C. for a period of 20 seconds. In this case the baking of the antistatic layer and the known stabilization of the polyamide fabric were combined in one operation. Finally the fabric was given an alkaline rinsing treatment and was dried on a tenter, whereupon it was found to exhibit excellent antistatic retention properties even under conditions of rather severe mechanical treatment while wet with a weakly alkaline solution.

While specific examples of preferred methods and products embodying the present invention have been described above, it will be apparent that many changes and modifications may be made in the methods of procedure and products without departing from the spirit of the invention. It will therefore be understood that the examples cited and the methods and products set forth above are intended to be illustrative only, and are not intended to limit the invention.

What is claimed is:

1. In a process for imparting antistatic properties to dielectric products in which the products are treated with an aqueous solution of polyacrylic acid at a temperature less than 100° C., thereafter drying the thus pretreated products, subsequently heating them to an elevated temperature above 100° C., then treating them with an aqueous solution of a quaternary alkyl ammonium compound and finally drying them, the improvement comprising incorporating 1%–3% based on the weight of the polyacrylic acid of an organic compound selected from the group consisting of hexamethylene diamine and ethylene diamine in the aqueous solution of polyacrylic acid.

2. A process according to claim 1 wherein the dielectric products are fibers of a high molecular weight synthetic polymer selected from the group consisting of polyamides, polyesters and acrylonitrile polymers.

3. A process according to claim 1 wherein the organic compound is hexamethylene diamine.

4. A process according to claim 1 wherein the organic compound is ethylene diamine.

5. A process according to claim 1 wherein the quaternary alkyl ammonium compound is stearyl dimethyl benzyl ammonium chloride.

6. A process for imparting antistatic properties to dielectric products consisting of the steps of treating the products with an aqueous solution at a temperature less than 100° C. of polyacrylic acid, a quaternary alkyl ammonium compound, and 1%–3% based on the weight of the polyacrylic acid of an organic compound selected from the group consisting of hexamethylene diamine and ethylene diamine, thereafter drying the thus treated products, and subsequently heating them to a temperature above 100° C.

References Cited in the file of this patent

UNITED STATES PATENTS

| | | |
|---|---|---|
| 2,168,535 | Nuesslein et al. | Aug. 8, 1939 |
| 2,253,146 | Spanagel | Aug. 19, 1941 |
| 2,343,095 | Smith | Feb. 29, 1944 |
| 2,403,960 | Stoops | July 16, 1946 |
| 2,421,363 | Young | May 27, 1947 |
| 2,500,122 | Dixon et al. | Mar. 7, 1950 |
| 2,868,668 | Caroselli et al. | Jan. 13, 1959 |